April 30, 1963 C. R. PUTERBAUGH 3,087,214
LICENSE PLATE ATTACHMENT
Filed Jan. 12, 1960
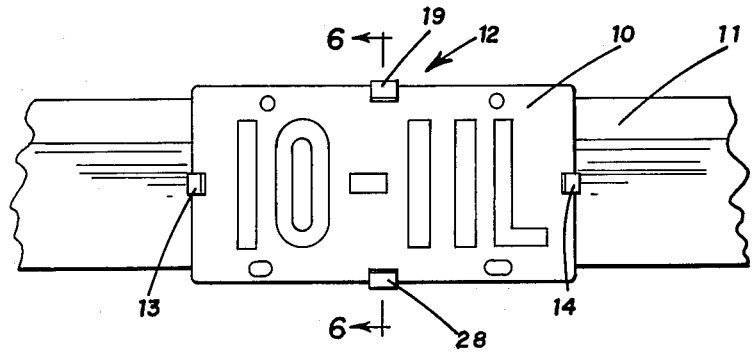
FIG. 1
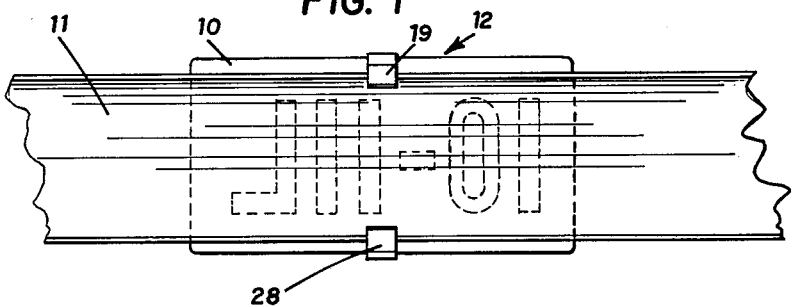
FIG. 2
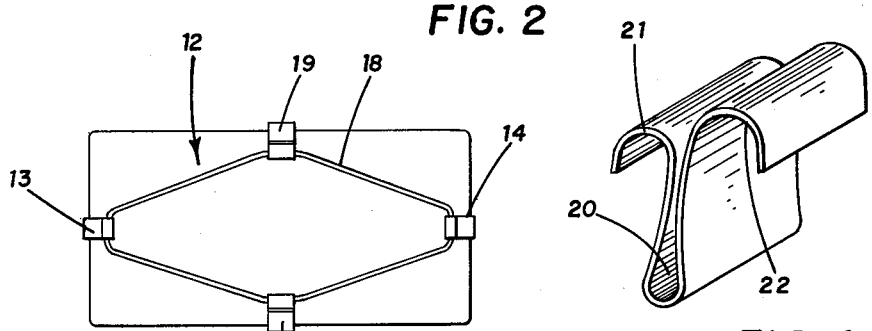
FIG. 3
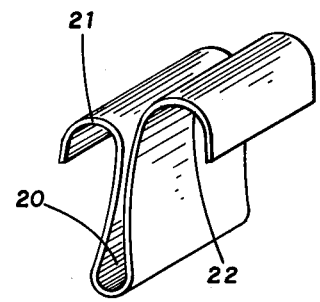
FIG. 4
FIG. 7
FIG. 8
FIG. 9
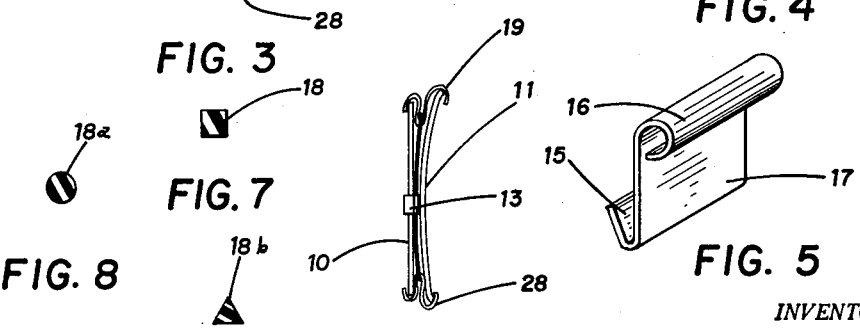
FIG. 6
FIG. 5
INVENTOR.
CHARLES RAY PUTERBAUGH
BY GLEIM & CANDOR
ATTORNEYS

United States Patent Office 3,087,214
Patented Apr. 30, 1963

3,087,214
LICENSE PLATE ATTACHMENT
Charles Ray Puterbaugh, 5833 White Oak Drive,
Dayton, Ohio
Filed Jan. 12, 1960, Ser. No. 1,908
5 Claims. (Cl. 24—81)

This invention relates to an improved article holding device, and, in particular, to an improved license plate holder for readily detachably securing a license plate to a bumper of an automobile or the like.

It is well known that it is relatively difficult to affix a vehicle license plate to a vehicle by bolts or the like in the conventional manner, as well as to subsequently detach the same. In particular, automobile dealers and the like are continuously mounting vehicle license plates to various automobiles for demonstration purposes and then are subsequently removing the plates therefrom to transfer the same to other automobiles. Since the conventional license plate mounting means require a great amount of time to mount or detach the license plates from the respective vehicles, it is a feature of this invention to provide an improved license plate holder for readily detachably securing a license plate to an automobile or the like whereby the plate can be easily attached thereto and easily detached as desired.

Generally, the license plate holder of this invention comprises a first pair of brackets each having a bight portion for receiving an edge of the license plate, the bight portions facing each other and having a continuous resilient member interconnecting the same and intending to draw the brackets toward each other whereby the first pair of brackets grips the plate therebetween. A second pair of brackets are respectively, operatively interconnected to the resilient member and have bight portions facing each other to respectively receive adjacent edges of the bumper of the automobile or the like whereby the resilient member tends to draw the second pair of brackets toward each other to firmly grip the bumper therebetween. In this manner, the license plate is firmly secured to the bumper of the automobile yet is adapted to be readily detached therefrom.

Accordingly, it is an object of this invention to provide an improved article holding device.

It is another object of this invention to provide an improved license plate holder for readily detachably securing a license plate to a bumper of an automobile or the like.

Other objects, uses and advantages of this invention will become apparent from a reading of the following specification taken in conjunction with the accompanying drawings forming a part thereof and wherein:

FIGURE 1 is a front view of a license plate secured to a bumper of an automobile or the like by the holder of this invention;

FIGURE 2 is a rear view of the license plate and bumper illustrated in FIGURE 1;

FIGURE 3 is a rear view of the holder of this invention secured to a license plate or the like;

FIGURE 4 is a perspective view of the bumper attaching means of this invention;

FIGURE 5 is a perspective view of the article holding means of this invention;

FIGURE 6 is an enlarged, cross-sectional view of the license plate and bumper illustrated in FIGURE 1 and is taken on line 6—6 thereof; and, FIGURES 7, 8 and 9 are respectively cross-sectional views of various embodiments of the resilient means of this invention.

Reference is now made to the accompanying drawings wherein like reference numerals are utilized throughout the various figures thereof to designate like parts where appropriate, and particular reference is made to FIGURE 1 illustrating a license plate 10 secured to a bumper 11 of an automobile or the like by a holder 12 of this invention.

As illustrated in FIGURES 3, 4 and 5, the license plate holder 12 of this invention includes a first pair of brackets 13 and 14 formed of metal, plastic, hard rubber, fiber, and the like and each having a bight portion 15 at one end thereof and a curled end 16 at the other end thereof, the bight portion 15 and the curled end 16 extending from opposite sides of a relatively flat interconnecting portion 17 thereof.

The curled ends 16 of the first pair of brackets 13 and 14 are respectively adapted to receive and retain lengths of a continuous resilient member or means 18 by either slipping the resilient means between the curled ends 16 and the respective flat portions 17 thereof or by curling the ends 16 around resilient member 18.

Resilient member 18 may comprise rubber, plastic, a metal spring or the like and is so constructed and arranged that the same tends to draw brackets 13 and 14 toward each other when the same have their respective bight portions 15 thereof grasping the outer perimeter of an article to be held thereby, such as the outer perimeter of the license plate 10.

Since the bight portions 15 of brackets 13 and 14 extend in the same direction from flat portions 17 thereof and face each other, brackets 13 and 14 can be easily assembled to article 10 by merely stretching the resilient means 18 until bight portions 15 have received the edges of the article 10. Subsequently, brackets 13 and 14 are released and resilient member 18 tends to draw the same together whereby brackets 13 and 14 firmly secure the article 10 therebetween.

A second pair of brackets 28 and 19 are respectively operatively interconnected to the resilient means or member 18 and each includes a substantially U-shaped trough or channel portion 20 having a pair of opposed bight portions 21 and 22 extending from opposite ends of the channel portion 20 of brackets 28 and 19, the brackets 28 and 19 respectively being disposed intermediate the brackets 13 and 14 and interconnected to the lengths of the resilient member 18 extending between brackets 13 and 14.

If desired, the bight portion 21 may have any suitable cross-sectional configuration, such as rectangular or the like, in order to conform to various sizes and/or cross-sectional configurations of bumpers or the like. Further, the bight portions 21 and 22 of the brackets 28 and 19 may be interchangeable, i.e., either bight portion 21 or 22 may be utilized as a finger stall and the other bight portion 21 or 22 may be utilized as the securing means as desired.

After the holder 12 has been secured to article 10 by the brackets 13 and 14 in the above manner, the resilient member 18 can be stretched in the manner illustrated in FIGURE 3 by merely grasping or inserting fingers in the finger stalls or bight portions 21 of the brackets 28 and 19 and pulling outwardly on brackets 28 and 19. In this manner, bight portions 22 of the brackets 28 and 19 can respectively receive and grasp a securing means, such as the bumper 11, whereby the holder 12 readily detachably secures the license plate 10 to the bumper 11. In order to detach the license plate 10 from bumper 11, it is merely necessary to grasp the finger stalls 21 of brackets 28 and 19 and spread the same apart through the resiliency of the resilient member 18 until the bight portions 22 are disengaged from the bumper 11.

Therefore, it can be seen that an improved article or license plate holder 12 has been provided whereby the article or license plate 10 can be rapidly and readily secured or detached from a bumper of an automobile or the like.

When the resilient member 18 is formed of rubber, plastic or the like, the same could have many various cross-sectional configurations. In particular, the embodiment of resilient member 18 illustrated in FIGURE 3 has a rectangular cross-sectional configuration as illustrated in FIGURE 7. By having a rectangular cross-sectional configuration, the resilient member 18 is not cut into by the curled ends 16 of brackets 13 and 14.

However, if desired, the resilient member 18 may have a circular or triangular cross-sectional configuration as illustrated at 18a and 18b in FIGURES 8 and 9 and the curled ends 16 of brackets 13 and 14 may be modified to accommodate the same.

While the holder 12 has been described as being particularly adapted to secure a license plate 10 to a bumper 11 of an automobile or the like, it is to be understood that the holder 12 has a wide variety of applications, the holder 12 being adapted to be detachably secured to an article and, in turn, detachably secure the article to a suitable supporting means.

While the foregoing presents the preferred embodiment of this invention, it is obvious that many modifications and/or equivalents may be employed without departing from the scope of the invention, which is defined in the appended claims.

What is claimed is:

1. A license plate holder for detachably securing a license plate to a bumper of an automobile comprising a first pair of brackets each having a bight portion for receiving an edge of the license plate, said bight portions facing each other, a continuous band-like resilient member interconnecting said first pair of brackets together and tending to draw said brackets toward each other whereby said first pair of brackets is adapted to grip opposite edges of the license plate therebetween, said resilient member extending between said first pair of brackets in a continuous manner whereby a pair of adjacent lengths of said resilient member extend between said first pair of brackets, and a second pair of brackets respectively operatively interconnected to said lengths of said resilient member and each having an oppositely located pair of inwardly facing bight portions for detachably receiving between one bight portion of one pair and a corresponding bight portion of the other pair other opposite edges of the license plate, and between the other bight portion of said one pair and the other bight portion of the other pair the opposite edges of the bumper of an automobile, respectively, to detachably secure the license plate to the bumper.

2. A license plate holder as set forth in claim 1 wherein said first pair of brackets each includes a curled end for receiving and retaining said resilient member thereto.

3. A license plate holder as set forth in claim 1 wherein said second pair of brackets each includes a curved end for readily manually grasping said end for manipulating said second pair of brackets into article and bumper engaging positions.

4. A license plate holder as set forth in claim 1 wherein said second pair of brackets each includes a third bight portion interconnected to the first mentioned bight portion thereof, said third bight portion facing in an opposite direction from the direction said pair of bight portions faces and receiving said resilient member.

5. A license plate holder as set forth in claim 1 wherein said resilient member has a rectangular cross-sectional configuration.

References Cited in the file of this patent
UNITED STATES PATENTS

| | | |
|---|---|---|
| 1,483,255 | Tonge | Feb. 12, 1924 |
| 1,894,552 | Cruze | Jan. 17, 1933 |
| 1,910,484 | Thompson | May 23, 1933 |
| 2,157,806 | Tilton | May 9, 1939 |
| 2,211,135 | Kuenning | Aug. 13, 1940 |
| 2,553,849 | Dines | May 22, 1951 |
| 2,637,240 | McClellan | May 5, 1953 |
| 2,666,612 | Howell | Jan. 19, 1954 |

FOREIGN PATENTS

| | | |
|---|---|---|
| 234,262 | Great Britain | May 28, 1925 |